United States Patent
Rong et al.

(10) Patent No.: US 10,268,497 B2
(45) Date of Patent: Apr. 23, 2019

(54) CONJUGATE CODE GENERATION FOR EFFICIENT DYNAMIC OPTIMIZATIONS

(71) Applicant: Intel Corporation, Santa Clara, CA (US)

(72) Inventors: Hongbo Rong, San Jose, CA (US);
Hyunchul Park, Santa Clara, CA (US);
Cheng Wang, San Ramon, CA (US);
Youfeng Wu, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 55 days.

(21) Appl. No.: 14/126,894

(22) PCT Filed: Oct. 24, 2013

(86) PCT No.: PCT/US2013/066581
§ 371 (c)(1),
(2) Date: Dec. 17, 2013

(87) PCT Pub. No.: WO2015/060850
PCT Pub. Date: Apr. 30, 2015

(65) Prior Publication Data
US 2015/0212836 A1    Jul. 30, 2015

(51) Int. Cl.
*G06F 9/455* (2018.01)
*G06F 8/41* (2018.01)
*G06F 8/52* (2018.01)

(52) U.S. Cl.
CPC .......... *G06F 9/4552* (2013.01); *G06F 8/4442* (2013.01); *G06F 8/52* (2013.01); *G06F 9/45508* (2013.01); *G06F 9/45533* (2013.01)

(58) Field of Classification Search
None
See application file for complete search history.

(56) References Cited

U.S. PATENT DOCUMENTS

| | | |
|---|---|---|
| 7,840,951 B1 | 11/2010 | Wright et al. |
| 8,281,294 B1 | 10/2012 | Vanderspek et al. |
| 8,359,496 B1 | 1/2013 | Bornstein et al. |
| 2006/0190934 A1 | 8/2006 | Kielstra et al. |

(Continued)

FOREIGN PATENT DOCUMENTS

| | | |
|---|---|---|
| CN | 103348323 A | 10/2013 |
| CN | 105556464 A | 5/2016 |

OTHER PUBLICATIONS

Ding-Yong Hong, HQEMU: A Multi-Threaded and Retargetable Dynamic Binary Translator on Multicores, Mar. 31, 2012; ACM 978-1-4503-1206-6.*

(Continued)

*Primary Examiner* — Wynuel S Aquino
(74) *Attorney, Agent, or Firm* — Spectrum IP Law Group LLC (57) ABSTRACT

Methods and apparatus relating to conjugate code generation for efficient dynamic optimizations are described. In an embodiment, a binary code and an intermediate representation (IR) code are generated based at least partially on a source program. The binary code and the intermediate code are transmitted to a virtual machine logic. The binary code and the IR code each include a plurality of regions that are in one-to-one correspondence. Other embodiments are also claimed and described.

22 Claims, 6 Drawing Sheets

(56) References Cited

U.S. PATENT DOCUMENTS

| | | | |
|---|---|---|---|
| 2010/0042981 A1* | 2/2010 | Dreyer | G06F 8/52 717/146 |
| 2010/0131888 A1 | 5/2010 | Nolte et al. | |
| 2010/0306746 A1* | 12/2010 | Barua | G06F 8/52 717/136 |
| 2010/0333090 A1 | 12/2010 | Wright et al. | |
| 2012/0198427 A1* | 8/2012 | Schmidt | G06F 8/443 717/151 |
| 2013/0139135 A1* | 5/2013 | Ditu | G06F 8/41 717/156 |
| 2013/0151824 A1* | 6/2013 | Bugnion | G06F 9/45504 712/244 |

OTHER PUBLICATIONS

Wang et al., "Acceldroid: Co-designed acceleration of Android bytecode", IEEE/ACM International Symposium on Code Generation and Optimization (CGO), Feb. 23-27, 2013, 1 Page of Abstract Only.

International Search Report and Written Opinion received for PCT Patent Application No. PCT/US2013/066581, dated Jul. 30, 2014, 11 Pages.

Wang et al., "Modeling and Performance Evaluation of TSO-Preserving Binary Optimization", International Conference on Parallel Architectures and Compilation Techniques (PACT), Oct. 10-14, 2011, 10 Pages.

Notice of Publication of Chinese Patent Application No. 201380079789.8, dated May 11, 2016, 5 pages including 3 pages of English translation.

Communication received from the European Patent Office for European Patent Application No. 13895899.6, dated Jun. 2, 2016.

International Preliminary Report on Patentability received for International Patent Application No. PCT/US2013/066581, dated May 6, 2016, 8 pages.

Extended European Search Report received for European Patent Application No. 13895899.6, dated May 4, 2017, 7 pages.

Translation of office action received for Chinese Patent Application No. 201380079789.8 dated May 18, 2018 and cited in an IDS filed on May 29, 2018.

Office Action received for Chinese Patent Application No. 201380079789.8, dated May 18, 2018, 20 pages.

Hong, et al., "HQEMU: A multi-Threaded and Retargetable Dynamic Binary Translator on Multicores," Symposium, Jul. 9, 2012, 10 pages, International Symposium on Code Generation and Optimization.

Office Action received for Chinese Patent Application No. 201380079789.8, dated Jan. 8, 2019, 20 pages including 11 pages of English translation.

* cited by examiner

```
191  cmp ecx,0x100
197  jnl 328
203  cmp esp,[0x8748720]
209  jc 512
215  mov ebx,ecx
217  shl ebx,1
219  and ebx,0xe
222  mov esi,0xe994
227  xchg ecx,ebx
229  sar esi,cl
231  mov ecx,esi
233  and ecx,0x3
236  mov [ebp+0xc4],ecx
239  mov esi,ebx
241  sar esi,2
244  and esi,0xe
247  mov [ebp+0xc8],esi
250  mov esi,0xe994
255  mov ecx,[ebp+0xc8]
258  sar esi,cl
260  and esi,0x3
263  mov ecx,[ebp+0xc4]
266  add ecx,esi
268  mov [ebp+0xbc],ecx
271  mov esi,ebx
273  sar esi,5
276  and esi,0x6
279  mov [ebp+0xc0],esi
282  mov esi,0xe994
287  mov ecx,[ebp+0xc0]
290  sar esi,cl
292  and esi,0x3
295  mov ecx,[ebp+0xbc]
298  add ecx,esi
300  mov esi,eax
302  add esi,ecx
304  jo 0x4026c032
310  add ebx,0x1
313  mov ecx,ebx
315  mov eax,esi
317  mov esi,[ebp+0xcc]
320  mov ebx,[ebp+0xd0]
323  jmp 191
```

*FIG. 3A*

```
// 3 loads are hoisted out of the loop to be here.
0xffa6df30: { pre au,xunlock,unlock,here,cmit,47; or.32/1 r46,r62,0x8741720;
                ld.32/0 r42,x86:[r5-48];ld.32/1 r43,x86:[r5-52]; limm1/0 }
0xffa6df44: { or.32/1 r44,r62,0xe994;limm1/0 }
0xffa6df4c: { ld.32/1 r45,x86:[r46]; alias 0,0,0,0,15 }
0xffa6df54: { execf0 nop }

// Loop starts here. 4 stores in the loop
0xffa6df58: { pre au,xunlock,unlock,here,cmit,2089; brc p3, 0xffd5f878
                <mtc_chain_0>; limm1/0; cmp.c.32/1 p3=ge,r1,0x100 }
0xffa6df68: { cmp.c.32/0 p3=ltu,r4,r45; brc p3, 0xffd5fb50 <mtc_chain_1>;
                segaddx/0 r27,x86:[r62+r1];shl.32/1 r41,r1,1 }
0xffa6df78: { and.c.32/0 r40,r41,14; sar.32/1 r37,r1,2 }
0xffa6df80: { pvs.32/0 pvsreg=r40,sar.32; and.c.32/1 r36,r37,14;
                segaddx/0 r3,x86:[r62+r1] }
0xffa6df8c: { sar.32/1 r31,r1,5 }
0xffa6df90: { pvs.32/0 pvsreg=r36,sar.32; sar.32/1 r39,r44,pvsreg;
                alias 0,1,0,15,15; st.32/1 r36,x86:[r5-56] }
0xffa6dfa0: { and.c.32/0 r30,r31,6; sar.32/1 r35,r44,pvsreg }
0xffa6dfa8: { pvs.32/0 pvsreg=r30,sar.32; and.32/1 r38,r39,3 }
0xffa6dfb0: { and.32/0 r34,r35,3; sar.32/1 r29,r44,pvsreg; alias 0,1,0,15,15;
                st.32/1 r30,x86:[r5-64] }
0xffa6dfc0: { and.32/0 r28,r29,3; add.32/1 r33,r34,r38; alias 0,1,0,15,15;
                st.32/1 r38,x86:[r5-60] }
0xffa6dfd0: { add.32/0 r1,r28,r33 }
0xffa6dfd4: { add.c.32/1 r6,r0,r1; alias 0,1,0,15,15; st.32/1 r33,x86:[r5-68] }
0xffa6dfe0: { execf1 nop }
0xffa6dfe4: { brc p3, 0xffd5fb78 <mtc_chain_2>; tflags/0 p3=o }
0xffa6dfec: { add.c.32/1 r1,r27,1; or.32/0 r0,r62,r6 }
0xffa6dff4: { br 0xffa6df58; or.32/0 r3,r62,r42; or.32/1 r6,r62,r43 }
```

*FIG. 3B*

```
B13 { pre au,unlock,here,cmit,0 ; shl.32/1 r44,r1,1 }
    { and.32/0 r43,r44,14 ; sar.32/1 r38,r1,2 }
    { pvs.32/0 pvsreg=r43,sar.32 ; and.32/1 r37,r38,14 }
    { cmp.32/0 p3=lt,r1,0x100; brc ~p3, 0x22385e0; limm0/0; sar.32/1 r33,r1,5 }
    { pvs.32/0 pvsreg=r37,sar.32 ; sar.32/1 r42,r45,pvsreg }
    { and.32/0 r31,r33,6 ; sar.32/1 r36,r45,pvsreg }
    { pvs.32/0 pvsreg=r31,sar.32 ; and.32/1 r39,r42,3 }
    { and.32/0 r35,r36,3 ; sar.32/1 r30,r45,pvsreg }
    { and.32/0 r29,r30,3 ; add.c.32/1 r34,r39,r35 }
    { add.c.32/0 r28,r34,r29 }
    { add.c.32/1 r0,r0,r28 }
    { pre au,bubble,0 }
    { rdsr.f.32 r27,weflags ; add.c.32/0 r1,r1,1 }
    { br B13; tatne.32/0 s3,r27,0x800 ; limm0/1 }
```

CONJUGATE CODE GENERATION FOR EFFICIENT DYNAMIC OPTIMIZATIONS

FIELD

The present disclosure generally relates to the field of computing. More particularly, an embodiment generally relates to conjugate code generation for efficient dynamic optimizations.

BACKGROUND

Some computer systems may use a Virtual Machine (VM) to support a guest operating system or application. Moreover, a VM includes software that runs on a host machine and implements an interface to a guest machine. A virtual machine's guest and the host generally utilize different ISAs (Instruction Set Architectures). Hence, while virtualization may be an important key to energy and cost efficiency (e.g., for cloud computing), the semantics gap between a conventional ISA and a VM guest may create a critical performance issue for virtual machine implementation.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

FIGS. 3A-3C illustrate sample pseudo code illustrating some features of conjugate code, according to some embodiments.

DETAILED DESCRIPTION

In the following description, numerous specific details are set forth in order to provide a thorough understanding of various embodiments. However, various embodiments may be practiced without the specific details. In other instances, well-known methods, procedures, components, and circuits have not been described in detail so as not to obscure the particular embodiments. Further, various aspects of embodiments may be performed using various means, such as integrated semiconductor circuits ("hardware"), computer-readable instructions organized into one or more programs ("software"), or some combination of hardware and software. For the purposes of this disclosure reference to "logic" shall mean either hardware, software, firmware (FM), or some combination thereof.

Some embodiments provide conjugate code generation for efficient dynamic optimizations. As discussed above, virtualization can be an important key to energy and cost efficiency (e.g., in cloud computing). However, the semantics gap between some conventional ISAs (e.g., x86) and a VM guest application (or guest Operating System (OS)) can become a critical performance issue in virtual machine implementations. To this end, an embodiment overcomes this gap with minimal changes to the compiler and the VM, helping cloud computing and HTML5 (or HyperText Markup Language 5, which is a markup language used for structuring and presenting content for the World Wide Web) implementation.

Generally, a virtual machine may include a runtime system, an interpreter, and a translator. The runtime system handles memory management, exceptions, and threading. The interpreter interprets the instructions of the guest machine code one by one, and profiles the code at the same time. When the code is found to be hot (i.e., is executed frequently, such as the code in a loop with a lot of iterations), the translator translates (e.g., compiles) the code as a whole into host machine code, which is then stored into a Translation Cache (TCache), and is subsequently executed. The translator can perform various optimizations to speed up the translated code.

Consider a source program that is compiled into binary, and then the binary runs on a virtual machine. There are two cases. First, the source program may be compiled statically (e.g., if it is written in a language like C). Second, it may also be compiled at run-time by a JIT (Just In Time) compiler (e.g., if it is written in a language like Java™ Bytecode or JavaScript). In either case, the compiled binary may be optimized by the translator of the VM, when it becomes hot. The first case is common. And, the second case is becoming increasingly common in the era of cloud computing and web browsing.

For example, in cloud computing, a virtual machine may be allocated to a user, and a Java/JavaScript JIT compiler runs on it when the user browses websites. Another example is browsing of websites by utilizing hardware logic (such as Transmeta™ Efficeon™ chip). Also, while a JIT compiler can be considered as a virtual machine as well, it is not called a virtual machine herein to avoid confusion with the underlying virtual machine.

In general, the virtual machine and the static/JIT compiler are designed separately, and there is no communication or co-operation between them. As a result, a semantic gap is introduced for this reason. Consider a realistic example, as the most popular ISA, x86 ISA, is a common guest ISA of various commercial VMs, e.g., Transmeta Efficeon. However, x86 may have limited registers available. Suppose a Java/JavaScript JIT compiler is running on a Transmeta Efficeon chip. The Java/JavaScript JIT compiler will compile a source program into x86 code first, then Efficeon will translate the x86 code into its native VLIW (Very Long Instruction Word) code.

When the compiler generates x86 binary, x86 machine-specific restrictions (not existing in the original source program) may have been enforced. After the JIT compiler, the majority of registers might be spilled into memory due to the limited number of x86 registers. As a result, the Efficeon chip will have great difficulty to promote the memory back to registers (which is a key performance optimization) even though Efficeon may have much more registers available than x86. This is due to several reasons. First, it may be expensive (e.g., too time-consuming or compute intensive) to perform accurate alias analysis at run-time at binary level. Second, it may not be safe to promote memory to registers due to memory model constraints. Third, the VM may have to preserve the same memory image so the live-out store operations cannot be removed. Due to these reasons, the x86 binary and the source program have a semantic gap. It is hardly practical for the VM to distinguish between what may be the necessary and unnecessary semantics due to the x86 restrictions.

To this end, some embodiments provide a general solution that removes the semantic gap appearing at the entry of the virtual machine, which may involve minimal changes to both the compiler on top of the VM and the VM itself, and has the potential to significantly improve the performance. Moreover, some embodiments target system-level virtual machines with atomic region execution support. An example is Transmeta Efficeon. For clarity, when discussing a compiler or compiler modifications/improvements herein, it is the compiler on top of the VM that is being discussed and not the translator (which is the internal compiler) in the VM.

Figure 1:
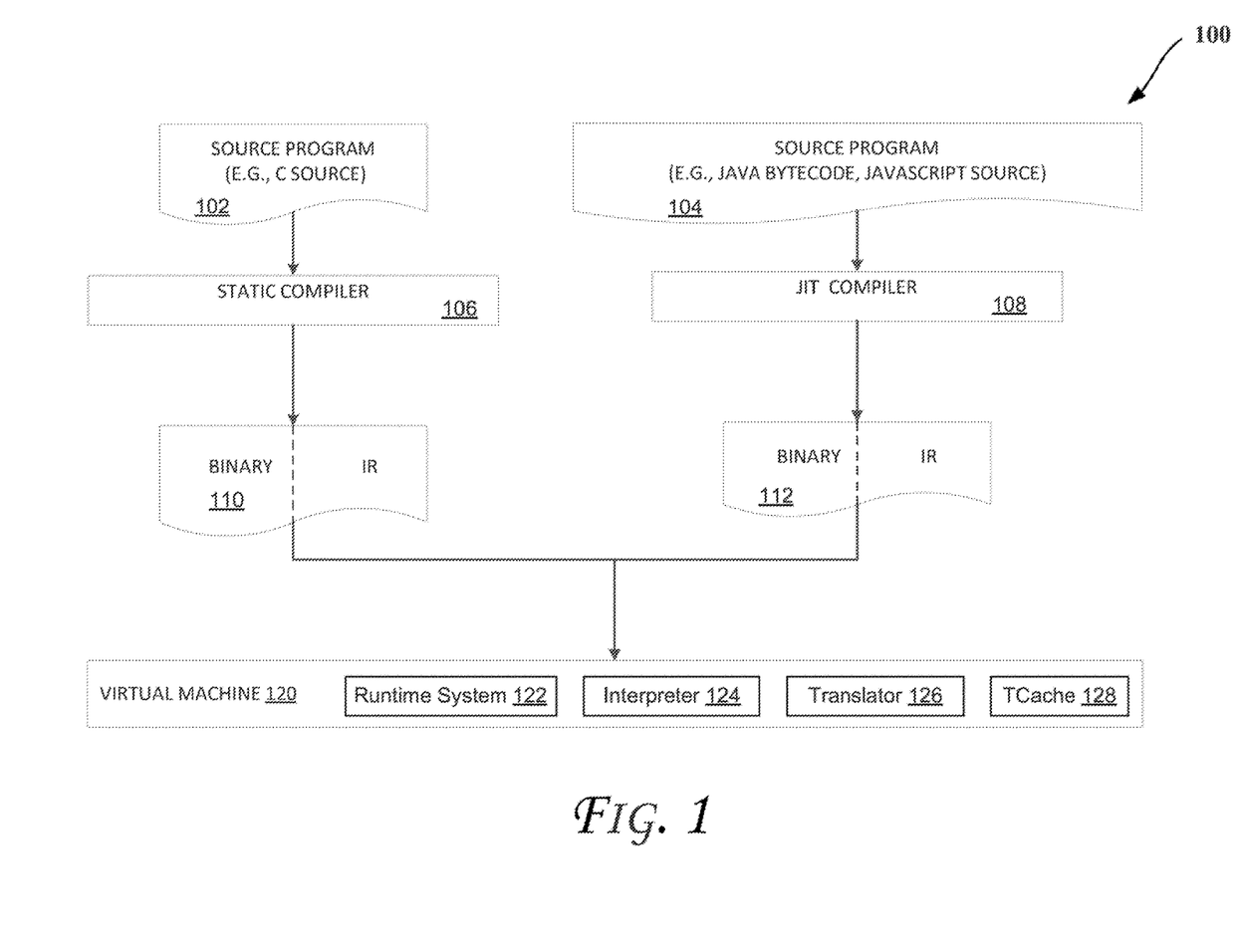
FIG. 1 illustrates a block diagram of a system to generate codes for a virtual machine, according to an embodiment.

FIG. 1 illustrates a block diagram of a system 100 to generate codes for a virtual machine, according to an embodiment. As shown in FIG. 1, a source program (items 102 and 104) is run through a static compiler 106 or JIT compiler 108, where each compiler generates two pieces of code (e.g., codes 110 and 112 each have two pieces of code, binary and IR (Intermediate Representation)) for the source program. These codes are then provided to a virtual machine 120. Accordingly, one embodiment generates two pieces of code for a source program (e.g., at the same time) for input to the VM 120. The first code is a conventional binary code and the other code is an IR (Intermediate Representation) code. Accordingly, the only change to the VM 120 is that it accepts IR code.

As shown in FIG. 1, the virtual machine 120 includes a runtime system logic 122, an interpreter logic 124, and a translator logic 126. The runtime system handles memory management, exceptions, and threading. The interpreter interprets the instructions of the guest machine code one by one, and profiles the code at the same time. When the code is found to be hot, the translator translates (e.g., compiles) the code as a whole into host machine code, which is then stored into a Translation Cache (TCache) 128, and is subsequently executed. The translator can perform various optimizations to speed up the translated code. Also, while TCache 128 is illustrated inside the VM 120, TCache may be located elsewhere in computing platform (such as discussed with various storage devices/memories with reference to FIGS. 2 and/or 4-6), as long as it is accessible by the translator 126.

The binary and IR codes may each include a set of regions. The regions between the binary and IR are in one-to-one correspondence. For a pair of such regions, one from the binary and the other from the IR, they are semantically equivalent; hence, their boundaries are in one-to-one correspondence and they have the same live values at two corresponding boundaries. For this reason, the binary and the IR codes are referred to as "conjugate code". Moreover, inside the pair of regions, the binary instructions and the IR instructions are not required to have any correspondence relationship, as long as the two regions have the same semantics. The correspondence happens at the boundaries.

Also note that the binary code may not have any annotation with it. It does not have any region information with it. Only the IR code may have the region information, e.g., for any IR instruction at a boundary of a region, that IR instruction is annotated with the address of the binary instruction that is at the corresponding boundary of the corresponding binary region.

Furthermore, the boundaries of an IR region may be arbitrarily decided. For example, a region can be directly treated by the VM as an atomic region. Thus, in practice, the boundaries may be decided by considering the constraints of the atomic region support of the VM.

Moreover, the IR code may have partially allocated registers, e.g., for any variable that is live (or in use) across a boundary of a region, it is allocated the same register and the same spilling memory location as in the corresponding binary region. Such partial allocation or spilling can be hard-coded in the IR code directly, or by some annotations in the IR code. For all the other variables, the IR region can use virtual registers in some embodiments. The IR assumes infinite number of virtual registers available and except for the partial allocation and spilling stated above, the IR is essentially machine independent (portable to other machines or otherwise ready for the compiler of any programming language, as long as the compiler accepts the IR). The IR can be embedded any high-level program information, or intermediate program information generated by the compiler.

After the conjugate code is generated, the compiler triggers the VM to directly translate the code (e.g., without interpretation), since the compiler already knows this is hot code. The VM translator, instead of starting from the binary code, starts from the IR, and translates it into the host ISA code. Because the IR contains the program information, and allows unlimited virtual registers for most of the variables, it is possible for the translator to perform taster and more accurate analysis (like type-based alias analysis if types are embedded in the IR), and generate better and more efficient code that makes full use of the host registers and has less spilling to memory.

In an embodiment, an IR region can be translated as a single atomic region. At each boundary, the translator inserts a special instruction (e.g., a COMMIT instruction). As discussed herein, a "COMMIT" instruction refers to an instruction used for a machine with atomic region support like Efficeon. When an atomic region is entered, the current machine state (register and memory state) is committed with the commit instruction. Then, in executing the atomic region, any change to the machine state is buffered but not committed. If any exception happens in the middle, the changes are thrown away (also called rollback), and the machine can recover to the committed machine state at the beginning of the atomic region. Otherwise, when the atomic region finishes normal, another commit instruction (may be at the beginning of a next atomic region) will commit all its changes to the machine state. From the IR instruction at the boundary, the translator reads the address of the associated binary instruction, and records it (e.g., internally) in some data structure. In this way, once the atomic region needs rollback, the VM can always find the corresponding binary instruction from which to restart. However, the VM can also determine to treat two adjacent IR regions as a single atomic region. In this case, the boundaries between these two regions are not necessary, and the partial allocation and spilling in the IR might have been overly conservative (but these do not affect correctness).

In one embodiment, the VM may also translate an IR region in its own way. For example, the compiler might be function-based, which generates an IR only for a function, but the VM might be trace-based, and for each IR region, the VM can extract hot traces and optimize them. In order for VM to effectively extract hot traces, the compiler might collect profile information about branches, and pass that profile information to the VM as part of the IR.

Additionally, the VM might not be able to successfully translate an IR region for various reasons such as register pressure. When this happens, the VM may fall back to interpret the corresponding binary region. It is always correct to do so because the correct live values have been maintained at the boundaries of the binary region.

After the IR has been successfully translated, the translated code is installed/stored in the TCache. Then, control is returned from the VM to the compiler. The translated code will later be running sometime when the starting address of the binary code becomes the current PC (Program Counter) value of the VM. During the execution, some exceptions may occur. In this case, the VM rolls back the atomic region which was created from the IR region that contained the exception-throwing instruction. The VM can always re-execute the atomic region by interpreting the corresponding binary region from the start. It may also re-translate the IR region more-conservatively and re-execute it.

As the binary code may change, corresponding change(s) may have to be made to the IR code and the translated code. There are two cases: (1) the binary is a self-modifying code. In this case, VM may automatically detect the change, and the IR code and the translated code are simply invalidated; and (2) The binary is not modified by itself, but instead, by the compiler. For example, a JIT compiler might chain the binary code with another piece of binary code by replacing a CALL instruction inside the binary with a BRANCH instruction that branches to the other binary code. In this case, the compiler fixes the IR code, and informs the VM about the change. Then, the VM can make corresponding change(s) in the translated code, without retranslating the IR from scratch.

Figure 2:
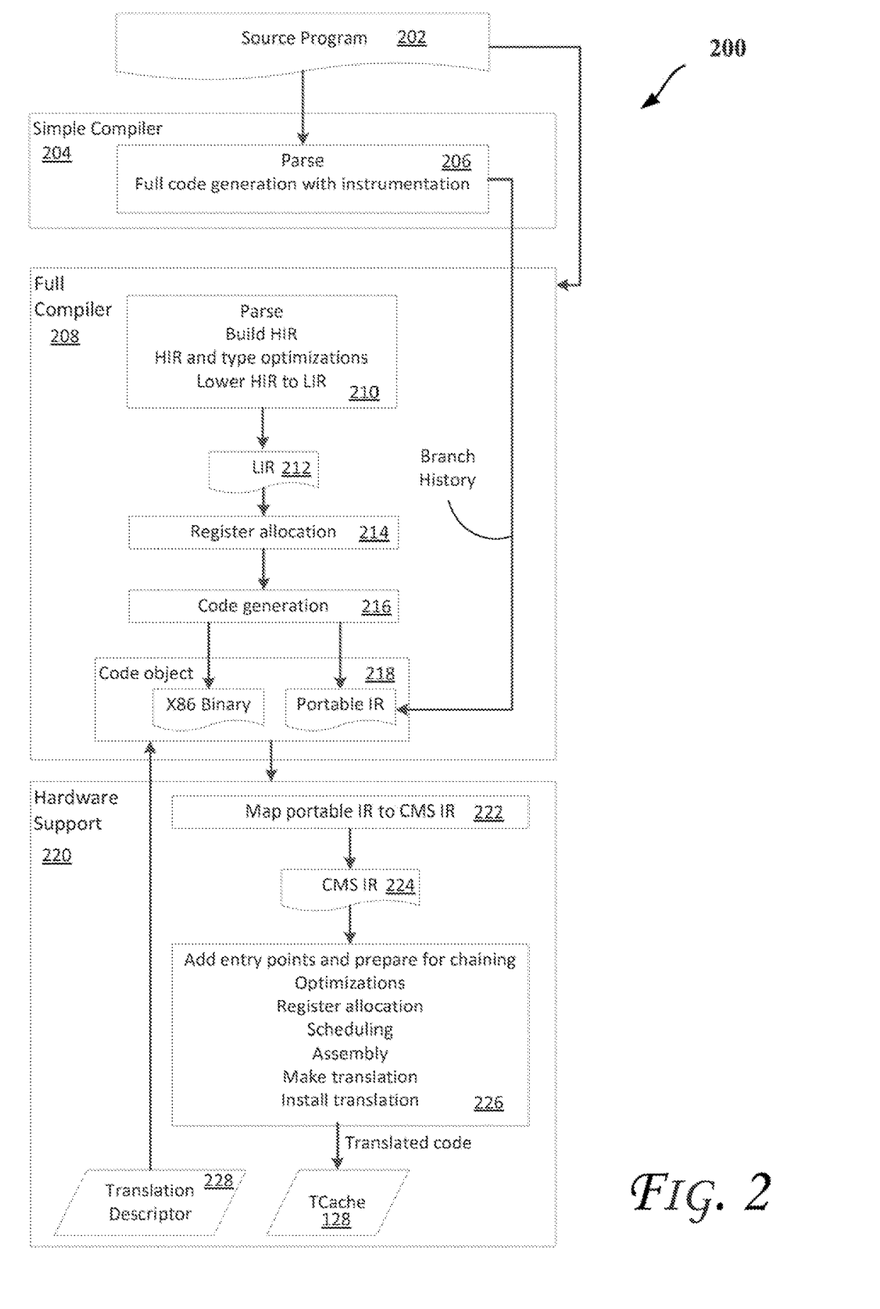
FIG. 2 illustrates a flow diagram of a method to provide conjugate code generation, according to an embodiment.

FIG. 2 illustrates a flow diagram of a method 200 to provide conjugate code generation for efficient dynamic optimizations, according to an embodiment. Moreover, one or more of the operations of FIG. 2 may be performed by one or more of the components discussed with reference to FIGS. 1 and/or 4-6. Also, FIG. 2 gives an example for the framework shown in FIG. 1.

In an embodiment, FIG. 2 shows an example with JavaScript VS compiler running on Efficeon hardware logic. For example, a JavaScript JIT compiler (e.g., Google V8 compiler) running on top of a Transmeta Efficeon chip may perform one or more of the operations shown in FIG. 2 (e.g., where the simple/full compiler 204/208 may be a V8 simple/full compiler and the hardware support 220 may be an Efficeon chip).

Referring to FIG. 2, two compilers may be used, e.g. a simple compiler 204 that compiles a function with basic optimizations, and a full compiler 208 that compiles the same function with full optimizations (e.g., once the function is found to be hot). For a function in a (e.g., JavaScript) source program 202, the simple compiler 204 parses it into an AST (Abstract Syntax Tree), and generates code directly from it at 206. To prepare for the branch history information required by the hardware support logic 220 (e.g., Efficeon CMS (Code Morphing Software, which includes the interpreter and translator)), each basic block that ends with a branch instruction needs to be instrumented at 206 to record a (e.g., one-byte) branch history, called disagree vector in CMS. Later, the simple compiler 204 can pass down this branch history to CMS so that CMS can extract traces based on it. Then, the code generated by the simple compiler is run, and the compiler runtime samples the code and identifies it as a hot function, and thus invokes the full compiler 208.

At 210, the full compiler 208 reparses the function in (e.g., the JavaScript) source program into an AST and from it, builds the HIR (High-level IR). The HIR is a CFG (Control Flow Graph) in SSA (Static Single Assignment) form. Then, HIR optimizations and type-specific optimizations are performed at 210. At 212, the HIR is lowered into LIR (Low-level IR). Register allocation is performed at 214, e.g., targeting x86 machine configuration. At 216, code generation is done to generate conjugate code. To generate the conjugate code, boundaries for IR code regions at LIR are first identified. One or more of the following points can be used as boundaries: the start of the function, each loop header, and/or the next instruction after a CALL instruction. Then, the live-range of each variable (where the live-range generally refers to the set of program points where the variable is live) is determined, and a virtual register number is assigned to it. If the live-range is crossing any IR region boundary, the virtual register number is set to a specific number (e.g., −1). If not, the virtual register number is considered to be an arbitrary number that has not been assigned to any other live-range before. Then, each LIR instruction is considered and x86 binary code is generated (e.g., as the original V8 does). The x86 code is stored in a garbage-collectible object (e.g., called code object in V8). After this, each LIR instruction is considered again to generate a portable IR code. We can use any general, machine-independent IR format; for example, LLVM (Low Level Virtual Machine) IR format, as the portable IR format. For every portable IR instruction that is at a boundary of a region, it may be annotated with the address of the first x86 instruction generated from the same IR instruction.

In an embodiment, for every destination and source operand in a portable IR instruction, if its live-range's virtual register number is −1, it is given the x86 register as determined by the x86 register allocation before. Also, if the live-range contains any spilling information related to this x86 register, spilling code (e.g., extra load/store operation(s)) are generated before or after the portable IR instruction (e.g., such as done by VS for spilling in the x86 binary). If, however, the live-range's virtual register number is not −1, then this virtual register number is encoded into the operand. The control flow graph information can be encoded into the portable IR as well. The basic blocks, their predecessors and successors, and their dominators and post-dominators, can all be encoded. Additionally, the branch history gathered before can be encoded as well.

In one embodiment, the portable IR code is stored after the x86 code of the function in the same code object. As they are in the same code object, they can be moved or freed by the garbage collector at the same time.

After 218, the conjugate code is ready and the compiler 208 issues a special CALL instruction. The hardware support 220 (e.g., Efficeon interpreter) detects this CALL, and triggers the translator (e.g., translator 126 of VM 120). At 222, the translator maps the portable IR in the conjugate code into its internal CMS IR. Then, it generates information specific to CMS. This includes making entry points, and preparing for chaining at 226. At every IR region boundary, it inserts a COMMIT instruction. It may also make this point as an entry point. For each CALL instruction, it checks if its call target and the call itself are at the same memory page. If not, it replaces the call target with a handle, and that will enable chaining of translations at run-time. At 224, the translator processes the CMS IR. At 226, entry points are added and prepared for chaining. Then optimizations (e.g., loop invariant code motion, dead code elimination, etc.) are done. Then register allocation is done, which maps virtual registers in the CMS IR instructions to physical registers. Then scheduling is done, which maps each CMS IR instruction to a specific hardware resource (e.g., Arithmetic logic unit, floating-point unit, etc.) and a specific time to run. Then assembly is done to transform the scheduled instructions to host machine code. Then the code is installed/stored into the TCache 128, and related information (e.g. the address of the code object containing the binary and the portable IR) is recorded in a translator descriptor 228. At 228, the translation descriptor points to the code object 218, so that at run-time (e.g., when retranslation is needed), the translator can obtain the portable IR again.

FIG. 3A illustrates sample X86 code generated by V8 compiler for an inner loop in benchmark bitops-3 bit-bits-in-byte. As can be seen, there are 10 load/store operations due to register spilling, as underlined in FIG. 3A. FIGS. 3B and 3C illustrate the Transmeta code corresponding to the X86 code of FIG. 3A. FIG. 3B shows the Transmeta code without applying the embodiments discussed herein. As can be seen, 7 load/store operations (underlined) are done in FIG. 3B which is less than FIG. 3A. FIG. 3C shows the generated Transmeta code with application of some embodiments discussed herein (e.g., conjugate code generation). In FIG. 3C, there is no load/store due to no spilling to memory at all. The code is also much cleaner as can be readily appreciated.

Referring to FIGS. 3A-3C, the original x86 code has 10 load/store operations due to register spilling (FIG. 3A). These loads/stores cannot be optimized directly by CMS in the Transmeta machine. In FIG. 3B, the Transmeta code generated without the embodiments discussed herein has 3 load operations hoisted out of the loop speculatively, but there are still 4 store operations in the loop. However, those spills are specific to x86 machine model, and do not exist in the IR of the embodiments discussed herein. Thus, in accordance with some embodiments, the CMS generates very efficient code, with no load/store operations for spilling at all (see, e.g., FIG. 3C). This could, for example, lead to ~25% speedup, compared with the loop running on the machine without application of embodiments discussed herein. Also, by visually comparing FIGS. 3B and 3C, one can see the code generated in accordance with embodiments discussed herein is much cleaner. This is another benefit of passing the IR code to the VM, as the IR code has no machine restrictions, except at region boundaries.

Furthermore, as previously mentioned, the semantics gap between a binary and the source program is a critical performance problem for VMs. Current solutions may rely on the compiler to generate binary code only, leaving this gap open. One way to overcome this problem is to implement the compiler inside the VM. This will generate code most efficiently, as the compiler and the VM are closely co-designed. This might not be a general solution though, considering the diversity of the programming languages. Also, it requires substantial changes to both the compiler and the VM. It is further possible to have a virtual machine that directly interprets/translates IR without binary code. This is possible for an application/language-level virtual machine (e.g., a Java compiler takes Java bytecode as the input). However, this is not realistic for a system-level virtual machine, which is the focus of some embodiments. System-level VMs support operation system code, which is binary, and there are also numerous applications in binary format. This explains why the compiler has to generate binary code instead of IR code alone.

Accordingly, an embodiment provides a general solution that overcomes the gap, requiring only minimal changes to both the compiler and the VM. It enables both to perform their optimizations fully, and it enables them to compile continuously, without the need to rediscover the same hot code at the VM side. Also, the compilation flow is continuous, e.g., at least in part, because the compiler finishes all of its (language-specific) optimizations, and the VM is immediately invoked to continue working on the IR code, and perform all the VM-specific optimizations. The compiler needs changes only at the end of its compilation (code generation, usually), and the VM needs changes only at the start of its translator.

In various embodiments, one or more of the following features are provided:

(1) The VM can leverage high-level program information. This enables faster and better analysis and optimizations that may not be possible at binary level.

(2) The VM provides lower-level hardware support transparently to speedup higher-level code. The IR is continuously optimized from the compiler to the VM, and the compiler does not need details of the VM.

(3) Some embodiments avoid rediscovery of hot code in multiple levels. When the compiler is a JIT compiler (e.g., for languages like Java/JavaScript/Python™, etc.), in some of the current techniques, both the compiler and the VM may generate profiles for hot code separately. By contrast, in some embodiments, once hot code is discovered by the compiler, the compiler directly triggers the VM to translate it. The compiler can also pass profile information to support the VM optimizations (e.g., the branch history to enable the VM to extract hot traces).

(4) An embodiment minimizes code changes to improve any existing VMs with any internal ISA. It may also minimize code changes to any existing compiler.

(5) One embodiment removes some redundant data structures and/or overlapping functionalities between the JIT compiler and the VM. The IR can contain information like the control flow graph (CFG), built by the JIT compiler, so that the VM does not have to rebuild it from the binary. The IR code may also include directives to the VM, so that VM does not have to perform optimizations that have already been done by the JIT compiler, e.g., to save the compile time of the VM, as there may be some optimizations common to compilers, such as in-lining, global value numbering, loop invariant code motion, dead code elimination, etc.

(6) An embodiment allows for more parallelism by maintaining only the live registers and live memory at a boundary of a region. The JIT compiler can identify live registers and live memory at the boundary, and thus the IR code only needs to maintain correct values for them. This may enable more parallelism. For example, in the binary code, arithmetic instructions usually generate eflags (which refers to status registers that contain information regarding the current state of the processor and tend to be useless in most cases). JIT compiler can choose not to generate eflags in the IR code when they are not live, and enable more parallelism. In another example, the load/store operations for spilling to memory that are local to a region can be avoided in the IR code, e.g., as demonstrated by the example in FIG. 3C.

Figure 4:
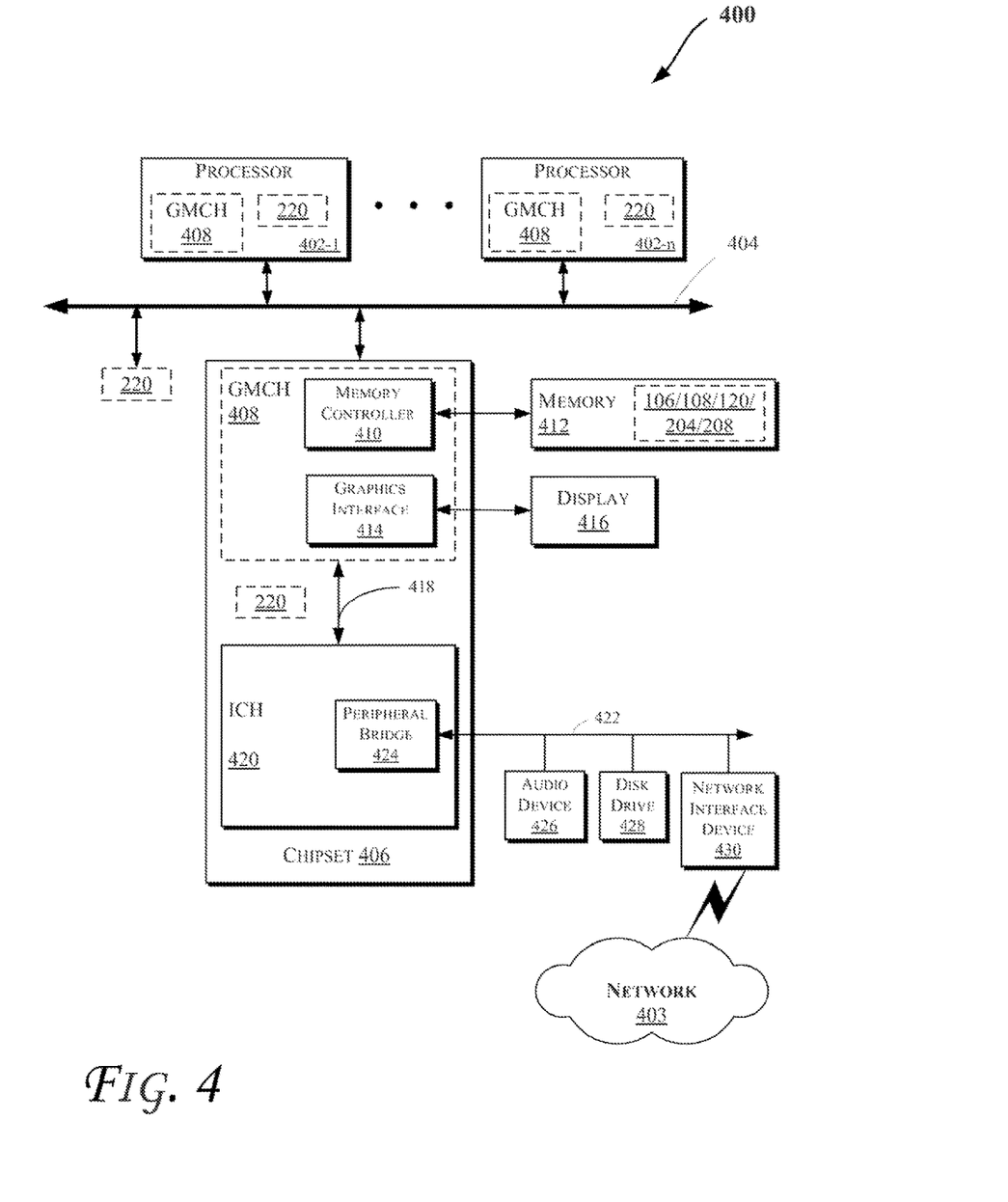
FIGS. 4-6 illustrate block diagrams of embodiments of computing systems, which may be utilized to implement some embodiments discussed herein.

FIG. 4 illustrates a block diagram of a computing system 400 in accordance with an embodiment. The computing system 400 may include one or more central processing unit(s) (CPUs) 402 or processors that communicate via an interconnection network (or bus) 404. The processors 402 may include a general purpose processor, a network processor (that processes data communicated over a computer network 403), or other types of a processor (including a reduced instruction set computer (RISC) processor or a complex instruction set computer (CISC)).

Moreover, the processors 402 may have a single or multiple core design. The processors 402 with a multiple core design may integrate different types of processor cores on the same integrated circuit (IC) die. Also, the processors 402 with a multiple core design may be implemented as symmetrical or asymmetrical multiprocessors. Additionally, the operations discussed with reference to FIGS. 1-3 may be performed by one or more components of the system 400. Also, various devices discussed herein (such as the desktop, smartphone, tablet, UMPC (Ultra-Mobile Personal Computer), laptop computer, Ultrabook™ computing device, smart watch, smart glasses, server, rack, etc.) may include one or more of the components of FIG. 4.

For example, memory 412 may store the information discussed with reference to FIGS. 1-3C (including compilers 106/108, VM 120, compilers 204/208, etc.). Further, one or more of the operations discussed with reference to FIGS. 1-3C may be executed on processor(s) 402 and/or hardware support logic 220. Also, system 400 may include an image capture device. Moreover, the scenes, images, or frames (e.g., which may be processed by the graphics logic in various embodiments) may be captured by the image capture device (such as a digital camera (that may be embedded in another device such as a smart phone, a tablet, a laptop, a stand-alone camera, etc.) or an analog device whose captured images are subsequently converted to digital form). Moreover, the image capture device may be capable of capturing multiple frames in an embodiment. Further, one or more of the frames in the scene are designed/generated on a computer in some embodiments. Also, one or more of the frames of the scene may be presented via a display (such as display 416, including for example a flat panel display device, etc.).

A chipset 406 may also communicate with the interconnection network 404. The chipset 406 may include a Graphics and Memory Control Hub (GMCH) 408. The GMCH 408 may include a memory controller 410 that communicates with a memory 412. The memory 412 may store data, including sequences of instructions, that may be executed by the CPU 402, or any other device included in the computing system 400. In one embodiment, the memory 412 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 404, such as multiple CPUs and/or multiple system memories.

The GMCH 408 may also include a graphics interface 414 that communicates with a display device 416. In one embodiment, the graphics interface 414 may communicate with the display device 416 via an accelerated graphics port (AGP) or Peripheral Component Interconnect (PCI) (or PCI express (PCIe) interface). In an embodiment, the display 416 (such as a flat panel display) may communicate with the graphics interface 414 through, for example, a signal converter that translates a digital representation of an image stored in a storage device such as video memory or system memory into display signals that are interpreted and displayed by the display 416. The display signals produced by the display device may pass through various control devices before being interpreted by and subsequently displayed on the display 416.

A hub interface 418 may allow the GMCH 408 and an input/output control hub (ICH) 420 to communicate. The ICH 420 may provide an interface to I/O device(s) that communicate with the computing system 400. The ICH 420 may communicate with a bus 422 through a peripheral bridge (or controller) 424, such as a peripheral component interconnect (PCI) bridge, a universal serial bus (USB) controller, or other types of peripheral bridges or controllers. The bridge 424 may provide a data path between the CPU 402 and peripheral devices. Other types of topologies may be utilized. Also, multiple buses may communicate with the ICH 420, e.g., through multiple bridges or controllers. Moreover, other peripherals in communication with the ICH 420 may include, in various embodiments, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 422 may communicate with an audio device 426, one or more disk drive(s) 428, and a network interface device 430 (which is in communication with the computer network 403). Other devices may communicate via the bus 422. Also, various components (such as the network interface device 430) may communicate with the GMCH 408 in some embodiments. In addition, the processor 402 and the GMCH 408 may be combined to form a single chip and/or a portion or the whole of the GMCH 408 may be included in the processors 402 (instead of inclusion of GMCH 408 in the chipset 406, for example). Furthermore, the graphics accelerator 416 may be included within the GMCH 408 in other embodiments.

Furthermore, the computing system 400 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., item 428), a floppy disk, a compact disk ROM (CD-ROM), a digital versatile disk (DVD), flash memory, a magneto-optical disk, or other types of nonvolatile machine-readable media that are capable of storing electronic data (e.g., including instructions).

In an embodiment, components of the system 400 may be arranged in a point-to-point (PtP) configuration such as discussed with reference to FIG. 5. For example, processors, memory, and/or input/output devices may be interconnected by a number of point-to-point interfaces.

Figure 5:
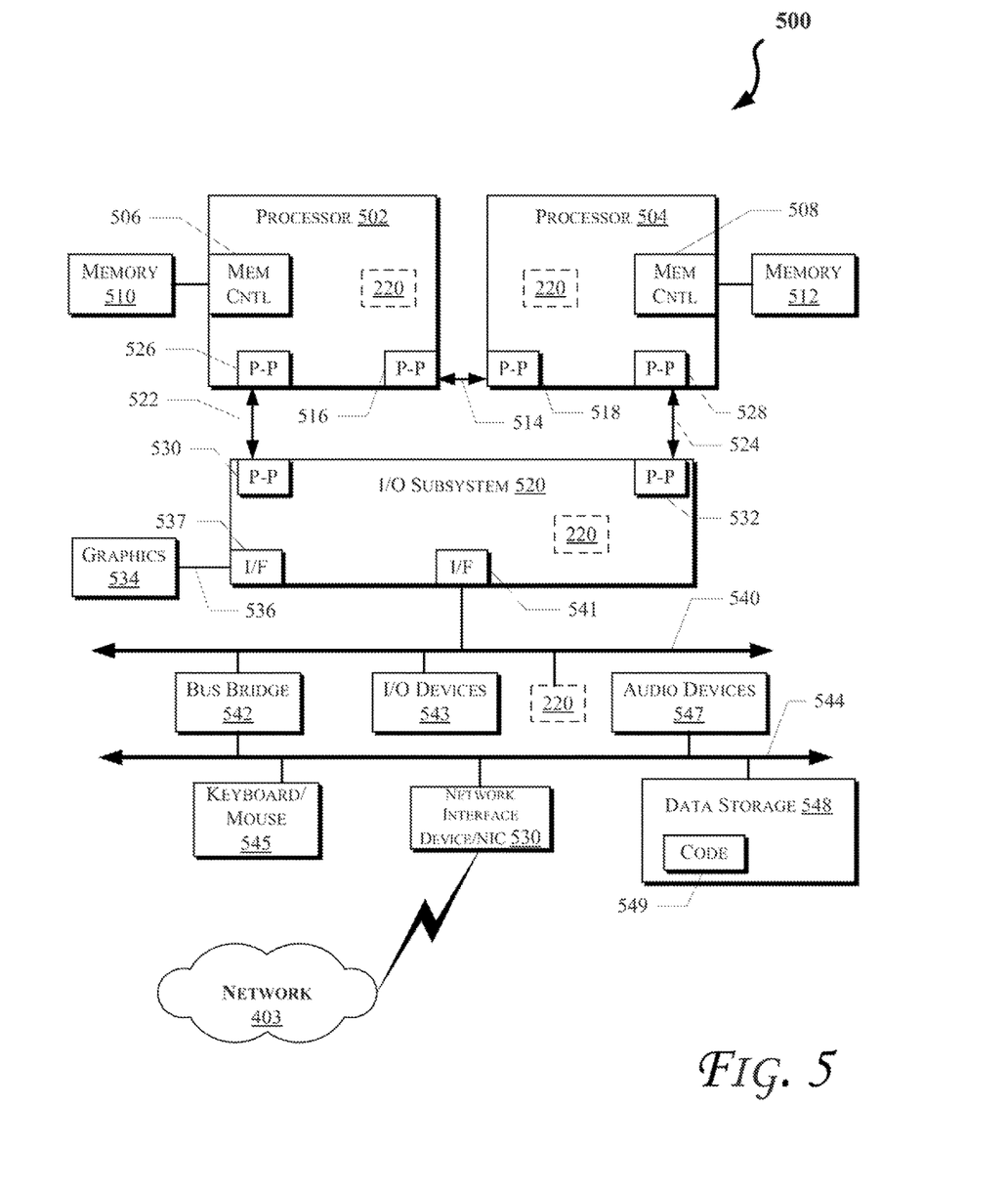

More specifically, FIG. 5 illustrates a computing system 500 that is arranged in a point-to-point (PtP) configuration, according to an embodiment. In particular, FIG. 5 shows a system where processors, memory, and input/output devices are interconnected by a number of point-to-point interfaces. The operations discussed with reference to FIGS. 1-4 may be performed by one or more components of the system 500.

As illustrated in FIG. 5, the system 500 may include several processors, of which only two, processors 502 and 504 are shown for clarity. The processors 502 and 504 may each include a local memory controller hub (MCH) 506 and 508 to enable communication with memories 510 and 512. The memories 510 and/or 512 may store various data such as those discussed with reference to the memory 412 of FIG. 4.

In an embodiment, the processors 502 and 504 may be one of the processors 402 discussed with reference to FIG. 4. The processors 502 and 504 may exchange data via a point-to-point (PtP) interface 514 using PtP interface circuits 516 and 518, respectively. Also, the processors 502 and 504 may each exchange data with a chipset 520 via individual PtP interfaces 522 and 524 using point-to-point interface circuits 526, 528, 530, and 532. The chipset 520 may further exchange data with a graphics circuit 534 via a graphics interface 536. e.g., using a PtP interface circuit 537.

At least one embodiment may be provided within the processors 502 and 504. Also, the operations discussed with reference to FIGS. 1-4 may be performed by one or more components of the system 500. Also, various devices discussed herein (such as the desktop, smartphone, tablet, UMPC (Ultra-Mobile Personal Computer), laptop computer, Ultrabook™ computing device, smart watch, smart glasses, server, rack, etc.) may include one or more of the components of FIG. 5.

For example, memory 510/512 may store the information discussed with reference to FIGS. 1-4 (including compilers 106/108, VM 120, compilers 204/208, etc.). Further, one or more of the operations discussed with reference to FIGS. 1-4 may be executed on processor(s) 502/504 and/or hardware support logic 220.

Other embodiments, however, may exist in other circuits, logic units, or devices within the system 500 of FIG. 5. Furthermore, other embodiments may be distributed throughout several circuits, logic units, or devices illustrated in FIG. 5.

The chipset 520 may communicate with a bus 540 using a PtP interface circuit 541. The bus 540 may communicate with one or more devices, such as a bus bridge 542 and I/O devices 543. Via a bus 544, the bus bridge 542 may communicate with other devices such as a keyboard/mouse 545, communication devices 546 (such as modems, network interface devices, or other communication devices that may communicate with the computer network 403), audio I/O device 547, and/or a data storage device 548. The data storage device 548 may store code 549 that may be executed by the processors 502 and/or 504.

Figure 6:
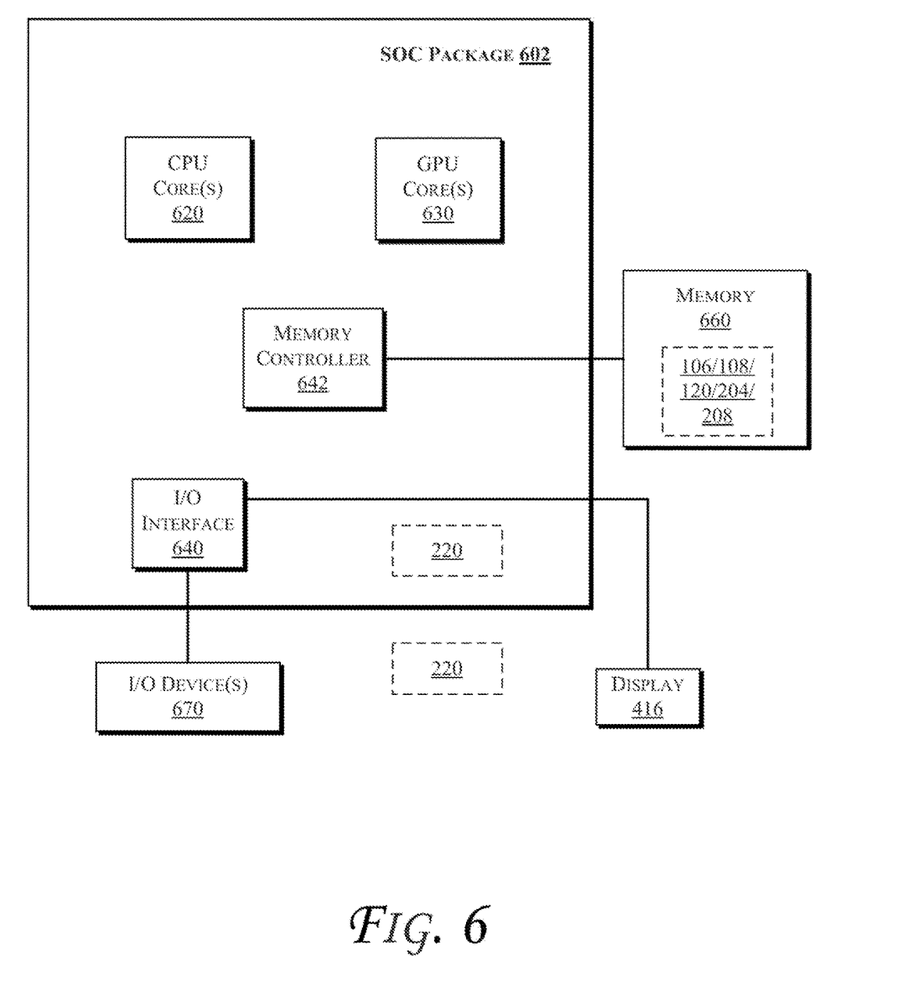

In some embodiments, one or more of the components discussed herein can be embodied as a System On Chip (SOC) device. FIG. 6 illustrates a block diagram of an SOC package in accordance with an embodiment. As illustrated in FIG. 6, SOC 602 includes one or more Central Processing Unit (CPU) cores 620, one or more Graphics Processor Unit (GPU) cores 630, an Input/Output (I/O) interface 640, and a memory controller 642. Various components of the SOC package 602 may be coupled to an interconnect or bus such as discussed herein with reference to the other figures. Also, the SOC package 602 may include more or less components, such as those discussed herein with reference to the other figures. Further, each component of the SOC package 620 may include one or more other components, e.g., as discussed with reference to the other figures herein. In one embodiment, SOC package 602 (and its components) is provided on one or more Integrated Circuit (IC) die, e.g., which are packaged into a single semiconductor device.

As illustrated in FIG. 6, SOC package 602 is coupled to a memory 660 (which may be similar to or the same as memory discussed herein with reference to the other figures) via the memory controller 642. In an embodiment, the memory 660 (or a portion of it) can be integrated on the SOC package 602.

The I/O interface 640 may be coupled to one or more I/O devices 670. e.g., via an interconnect and/or bus such as discussed herein with reference to other figures. I/O device(s) 670 may include one or more of a keyboard, a mouse, a touchpad, a display (e.g., display 416), an image/video capture device (such as a camera or camcorder/video recorder), a touch screen, a speaker, or the like. Also, various devices discussed herein (such as the desktop, smartphone, tablet, UMPC (Ultra-Mobile Personal Computer), laptop computer, Ultrabook™ computing device, smart watch, smart glasses, server, rack, etc.) may include one or more of the components of FIG. 4.

For example, memory 660 may store the information discussed with reference to FIGS. 1-5 (including compilers 106/108, VM 120, compilers 204/208, etc.). Further, one or more of the operations discussed with reference to FIGS. 1-5 may be executed on cores(s) 620/630 and/or hardware support logic 220. Furthermore, SOC package 602 may include/integrate logic 220 in an embodiment. Alternatively, logic 220 may be provided outside of the SOC package 602 (i.e., as a discrete logic).

The following examples pertain to further embodiments. Example 1 includes 1 an apparatus comprising: compiler logic to generate a binary code and an intermediate representation (IR) code based at least partially on a source program, wherein the binary code and the IR are to be transmitted to a virtual machine logic, wherein the binary code and the IR code are each to comprise a plurality of regions. Example 2 includes the apparatus of example 1, wherein each region of the plurality of binary code regions is to be semantically equivalent to a corresponding region of the IR code. Example 3 includes the apparatus of example 1, comprising hardware support logic to apply one or more of the following operations to the IR code: add an entry point, code optimization, register allocation, scheduling, assembly, or code installation. Example 4 includes the apparatus of example 3, wherein the IR code is to be stored in a translation cache after application of the one or more operations. Example 5 includes the apparatus of example 1, wherein the compiler logic is one of a static compiler logic or just-in-time compiler logic. Example 6 includes the apparatus of example 1, wherein the IR code is to comprise a portable IR code, wherein the portable IR code is ready to be used by a compiler of a plurality of programming languages. Example 7 includes the apparatus of example 1, wherein the virtual machine logic is to comprise one or more of: a runtime system logic, a interpreter logic, a translator, or a translation cache. Example 8 includes the apparatus of example 1, wherein the compiler logic is to identify boundaries for IR code regions, wherein one or more of the following points are to be used as boundaries: start of a function, each loop header, or a next instruction after a CALL instruction. Example 9 includes the apparatus of example 1, wherein the virtual machine logic is to perform one or more optimizations to speed up an IR region. Example 10 includes the apparatus of any of examples 1 to 9, wherein the compiler logic, memory, and one or more processor cores are on a single integrated circuit device. Example 1 includes a method comprising: generating, at a compiler logic, a binary code and an intermediate representation (IR) code based at least partially on a source program, wherein the binary code and the IR are transmitted to a virtual machine logic, wherein the binary code and the IR code each comprise a plurality of regions. Example 12 includes the method of example 11, wherein each region of the plurality of binary code regions is semantically equivalent to a corresponding region of the IR code. Example 13 includes the method of example 11, further comprising applying one or more of the following operations to the IR code: add an entry point, code optimization, register allocation, scheduling, assembly, or code installation. Example 14 includes the method of example 13, further comprising storing the IR code in a translation cache after application of the one or more operations. Example 15 includes the method of example 11, wherein the compiler logic is one of a static compiler logic or just-in-time compiler logic. Example 16 includes the method of example 11, wherein the IR code comprises a portable IR code, wherein the portable IR code is ready to be used by a compiler of a plurality of programming languages. Example 17 includes the method of example 11, further comprising identifying boundaries for IR code regions, wherein one or more of the following points are used as boundaries: start of a function, each loop header, or a next instruction after a CALL instruction. Example 18 includes the method of example 11, further comprising the virtual machine logic performing one or more optimizations to speed up an IR region.

Example 19 includes a computing system comprising: one or more Central Processing Unit (CPU) cores: one or more Graphics Processor Unit (GPU) cores; memory to store a binary code and an intermediate representation (IR) code; and compiler logic to generate the binary code and the intermediate representation (IR) code based at least partially on a source program, wherein the binary code and the IR are to be transmitted to a virtual machine logic, wherein the binary code and the IR code are each to comprise a plurality of regions. Example 20 includes the system of example 19, wherein each region of the plurality of binary code regions is to be semantically equivalent to a corresponding region of the IR code. Example 21 includes the system of example 19, comprising hardware support logic to apply one or more of the following operations to the IR code: add an entry point, code optimization, register allocation, scheduling, assembly, or code installation. Example 22 includes the system of example 19, wherein the compiler logic is one of a static compiler logic or just-in-time compiler logic. Example 23 includes the system of example 19, wherein the IR code is to comprise a portable IR code, wherein the portable IR code is ready to be used by a compiler of a plurality of programming languages.

Example 24 includes an apparatus comprising means for performing a method as set forth in any of examples 11 to 18.

Example 25 includes machine-readable storage including machine-readable instructions, when executed, to implement a method or realize an apparatus as set forth in any of examples 11 to 18.

Example 26 includes a computer-readable medium comprising one or more instructions that when executed on a processor configure the processor to perform one or more operations to: generating, at a compiler logic, a binary code and an intermediate representation (IR) code based at least partially on a source program, wherein the binary code and the IR are transmitted to a virtual machine logic, wherein the binary code and the IR code each comprise a plurality of regions. Example 27 includes the computer-readable medium of example 26, further comprising one or more instructions that when executed on the processor configure the processor to perform one or more operations to cause each region of the plurality of binary code regions to be semantically equivalent to a corresponding region of the IR code. Example 28 includes the computer-readable medium of example 26, further comprising one or more instructions that when executed on the processor configure the processor to perform one or more operations to cause application of one or more of the following operations to the IR code: add an entry point, code optimization, register allocation, scheduling, assembly, or code installation. Example 29 includes the computer-readable medium of example 26, wherein the compiler logic is one of a static compiler logic or just-in-time compiler logic. Example 30 includes the computer-readable medium of example 26, wherein the IR code comprises a portable IR code, wherein the portable IR code is ready to be used by a compiler of a plurality of programming languages. Example 31 includes the computer-readable medium of example 26, further comprising one or more instructions that when executed on the processor configure the processor to perform one or more operations to cause identification of boundaries for IR code regions, wherein one or more of the following points are used as boundaries: start of a function, each loop header, or a next instruction after a CALL instruction. Example 32 includes the computer-readable medium of example 26, further comprising one or more instructions that when executed on the processor configure the processor to perform one or more operations to cause the virtual machine logic to perform one or more optimizations to speed up an IR region.

In various embodiments, the operations discussed herein, e.g., with reference to FIGS. 1-6, may be implemented as hardware (e.g., logic circuitry), software, firmware, or combinations thereof, which may be provided as a computer program product, e.g., including a tangible (such as a non-transitory) machine-readable or computer-readable medium having stored thereon instructions (or software procedures) used to program a computer to perform a process discussed herein. The machine-readable medium may include a storage device such as those discussed with respect to FIGS. 1-6 (including, for example, ROM, RAM, flash memory, hard drive, solid state drive, etc.).

Additionally, such computer-readable media may be downloaded as a computer program product, wherein the program may be transferred from a remote computer (e.g., a server) to a requesting computer (e.g., a client) by way of data signals provided in a carrier wave or other propagation medium via a communication link (e.g., a bus, a modem, or a network connection).

Reference in the specification to "one embodiment" or "an embodiment" means that a particular feature, structure, and/or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments, "connected" may be used to indicate that two or more elements are in direct physical or electrical contact with each other. "Coupled" may mean that two or more elements are in direct physical or electrical contact. However. "coupled" may also mean that two or more elements may not be in direct contact with each other, but may still cooperate or interact with each other.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
 a processor, coupled to memory, the processor to comprise compiler logic to generate a binary code and an intermediate representation (IR) code based at least partially on a source program,
 wherein the binary code and the IR code are to be transmitted to virtual machine logic, wherein the binary code and the IR code are each to comprise a plurality of regions, wherein each region of the plurality of binary code regions is to be semantically equivalent to a corresponding region of the IR code and boundaries of the IR code regions are to correspond to the boundaries of the corresponding binary code regions, wherein for any variable that is live or in use across a boundary of an IR code region, the variable is allocated a register and a spilling memory location, wherein the IR code comprises a portable IR code, wherein the portable IR code is capable of being readily used by a compiler of a plurality of programming languages, wherein the processor comprises translator logic to map the portable IR code to a Code Morphing Software (CMS) IR code, wherein a commit instruction is to be inserted at every IR code region boundary after mapping of the portable IR code into the CMS IR code, wherein the virtual machine logic is to perform one or more optimizations to speed up an IR region based at least in part on the mapping of the portable IR code into the CMS IR code.

2. The apparatus of claim 1, comprising hardware support logic to apply one or more of the following operations to the IR code: add an entry point, code optimization, register allocation, scheduling, assembly, or code installation.

3. The apparatus of claim 2, wherein the IR code is to be stored in a translation cache after application of the one or more operations.

4. The apparatus of claim 1, wherein the compiler logic is one of a static compiler logic or just-in-time compiler logic.

5. The apparatus of claim 1, wherein the virtual machine logic is to comprise one or more of: runtime system logic, the interpreter logic, a translator, or a translation cache.

6. The apparatus of claim 1, wherein the compiler logic is to identify the boundaries for IR code regions based on one or more of the following points: start of a function or each loop header.

7. The apparatus of claim 1, wherein the compiler logic, the memory, and one or more processor cores are on a single integrated circuit device.

8. The apparatus of claim 1, wherein the translator logic is to map the IR code to an internal CMS IR code prior to generation of information specific to the CMS IR code.

9. The apparatus of claim 1, wherein the compiler logic is to identify boundaries for IR code regions, wherein a next instruction after a CALL instruction is to be used to identify at least one the boundaries for the IR code regions, wherein in response to the CALL instruction, translator logic is to map the IR code to a Code Morphing Software (CMS) IR code based on an internal CMS IR code.

10. The apparatus of claim 9, wherein the CMS IR code is to comprise the translator logic and an interpreter logic.

11. The apparatus of claim 10, wherein the interpreter logic is to interpret instructions of a guest virtual machine code one by one.

12. The apparatus of claim 1, wherein the virtual machine logic is to start translating from the IR code.

13. A method comprising:
generating, at a compiler logic, a binary code and an intermediate representation (IR) code based at least partially on a source program,
wherein the binary code and the IR code are transmitted to virtual machine logic,
wherein the binary code and the IR code each comprise a plurality of regions, wherein each region of the plurality of binary code regions is semantically equivalent to a corresponding region of the IR code and boundaries of the IR code regions are to correspond to the boundaries of the corresponding binary code regions, wherein for any variable that is live or in use across a boundary of an IR code region, the variable is allocated a register and a spilling memory location, wherein the IR code comprises a portable IR code, wherein the portable IR code is capable of being readily used by a compiler of a plurality of programming languages, wherein translator logic maps the portable IR code to a Code Morphing Software (CMS) IR code, wherein a commit instruction is inserted at every IR code region boundary after mapping of the portable IR code into the CMS IR code, wherein the virtual machine logic performs one or more optimizations to speed up an IR region based at least in part on the mapping of the portable IR code into the CMS IR code.

14. The method of claim 13, further comprising applying one or more of the following operations to the IR code: add an entry point, code optimization, register allocation, scheduling, assembly, or code installation.

15. The method of claim 14, further comprising storing the IR code in a translation cache after application of the one or more operations.

16. The method of claim 13, wherein the compiler logic is one of a static compiler logic or just-in-time compiler logic.

17. The method of claim 13, further comprising identifying the boundaries for IR code regions based on one or more of the following points: start of a function or each loop header.

18. A computing system comprising:
one or more processor cores;
memory, coupled to the one or more processor cores, to store a binary code and an intermediate representation (IR) code; and
compiler logic to generate the binary code and the intermediate representation (IR) code based at least partially on a source program,
wherein the binary code and the IR code are to be transmitted to virtual machine logic, wherein the binary code and the IR code are each to comprise a plurality of regions, wherein each region of the plurality of binary code regions is to be semantically equivalent to a corresponding region of the IR code and boundaries of the IR code regions are to correspond to the boundaries of the corresponding binary code regions, wherein for any variable that is live or in use across a boundary of an IR code region, the variable is allocated a register and a spilling memory location, wherein the IR code comprises a portable IR code, wherein the portable IR code is capable of being readily used by a compiler of a plurality of programming languages, wherein the processor comprises translator logic to map the portable IR code to a Code Morphing Software (CMS) IR code, wherein a commit instruction is to be inserted at every IR code region boundary after mapping of the portable IR code into the CMS IR code, wherein the virtual machine logic is to perform one or more optimizations to speed up an IR region based at least in part on the mapping of the portable IR code into the CMS IR code.

19. The system of claim 18, comprising hardware support logic to apply one or more of the following operations to the IR code: add an entry point, code optimization, register allocation, scheduling, assembly, or code installation.

20. The system of claim 18, wherein the compiler logic is one of a static compiler logic or just-in-time compiler logic.

21. A non-transitory computer-readable medium comprising one or more instructions that when executed on a processor configure the processor to perform one or more operations to:
generating, at a compiler logic, a binary code and an intermediate representation (IR) code based at least partially on a source program, wherein the binary code and the IR are transmitted to virtual machine logic, wherein the binary code and the IR code each comprise a plurality of regions, wherein each region of the plurality of binary code regions is to be semantically equivalent to a corresponding region of the IR code and boundaries of the IR code regions are to correspond to the boundaries of the corresponding binary code regions, wherein for any variable that is live or in use across a boundary of an IR code region, the variable is allocated a register and a spilling memory location, wherein the IR code comprises a portable IR code, wherein the portable IR code is capable of being readily used by a compiler of a plurality of programming languages, wherein the processor comprises translator logic to map the portable IR code to a Code Morphing Software (CMS) IR code, wherein a commit instruction is to be inserted at every IR code region boundary after mapping of the portable IR code into the CMS IR code, wherein the virtual machine logic is to perform one or more optimizations to speed up an IR region based at least in part on the mapping of the portable IR code into the CMS IR code.

22. The non-transitory computer-readable medium of claim 21, further comprising one or more instructions that when executed on the processor configure the processor to perform one or more operations to cause application of one or more of the following operations to the IR code: add an entry point, code optimization, register allocation, scheduling, assembly, or code installation.

* * * * *